United States Patent [19]

Robertson et al.

[11] 4,369,547

[45] Jan. 25, 1983

[54] ANIMAL SKINNING MACHINE

[76] Inventors: Donald E. Robertson, P.O. Box 341; Randall E. Robertson, 8700 Sarah La.; Darrin D. Robertson; Brooks A. Robertson, both of P.O. Box 341, all of Liberty, Mo. 64068

[21] Appl. No.: 292,255

[22] Filed: Aug. 12, 1981

[51] Int. Cl.³ ............................................. A22B 5/16
[52] U.S. Cl. ................................................... 17/21
[58] Field of Search .................. 17/62, 21, 50; 99/589

[56] References Cited

U.S. PATENT DOCUMENTS

| 3,308,502 | 3/1967 | Bednarz et al. | 17/21 |
| 4,025,986 | 5/1977 | Koken | 17/21 |
| 4,084,292 | 4/1978 | Harlan et al. | 17/21 X |

FOREIGN PATENT DOCUMENTS 7503945 10/1976 Netherlands ............................ 17/21

Primary Examiner—Willie G. Abercrombie

Attorney, Agent, or Firm—James W. Pearce; Roy F. Schaeperklaus

[57] ABSTRACT

An animal skinning machine. Upper and lower clamp guide trackways guide clamp carriages between which a clamp body is mounted. A first clamp and a clamp frame are carried by the clamp body. Clamp actuators carried by the clamp frame support a second clamp which is movable between a released position spaced from the first clamp and an engaged position for cooperating with the first clamp for engaging a leading edge portion of an animal skin. An elongated knife member is mounted adjacent entry ends of the clamp guide trackways for separating the skin from a carcass of the animal. Upper and lower roller guide trackways guide roller carriages and a roller rotatably mounted on the roller carriages for movement between a retracted position at which the roller is spaced from the knife member and an advanced position adjacent the knife member and spaced therefrom sufficiently to permit the skin to pass between the knife member and the roller.

4 Claims, 13 Drawing Figures

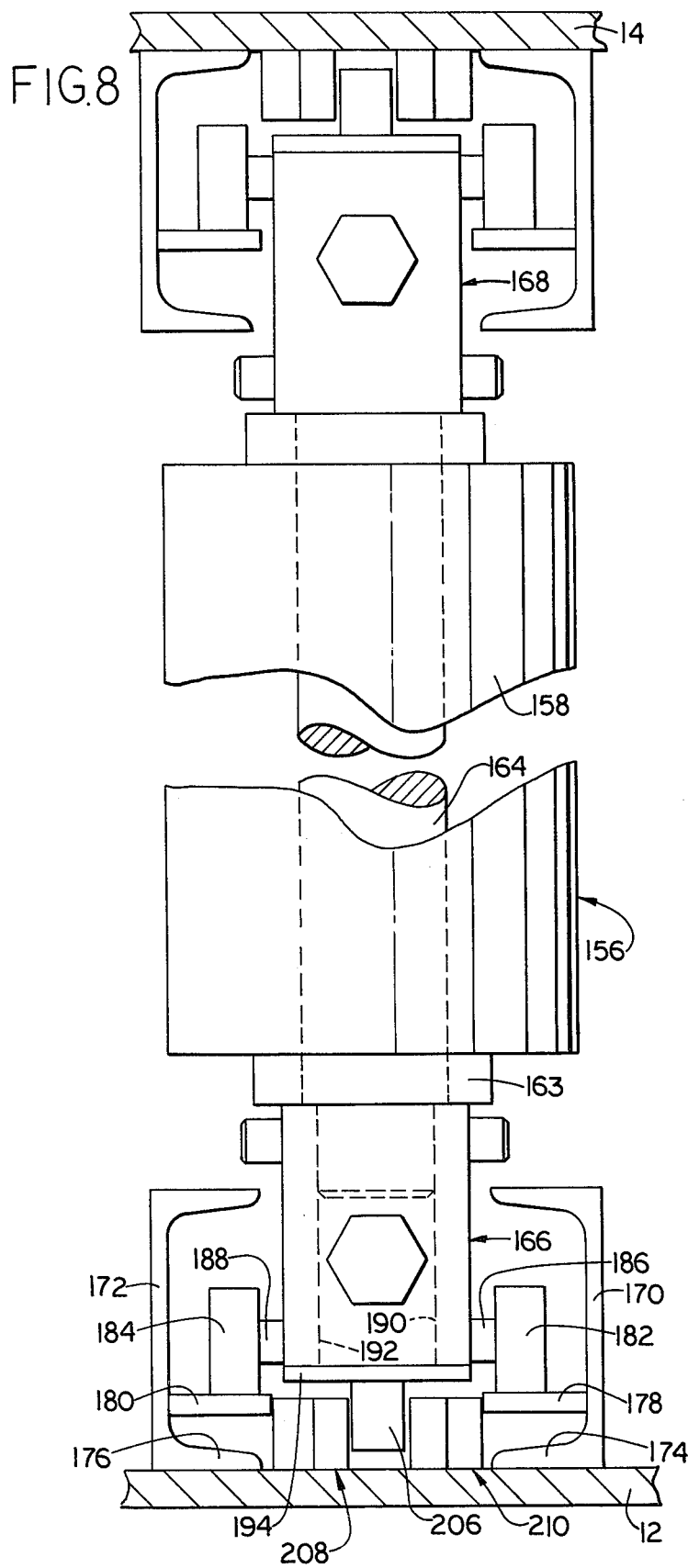
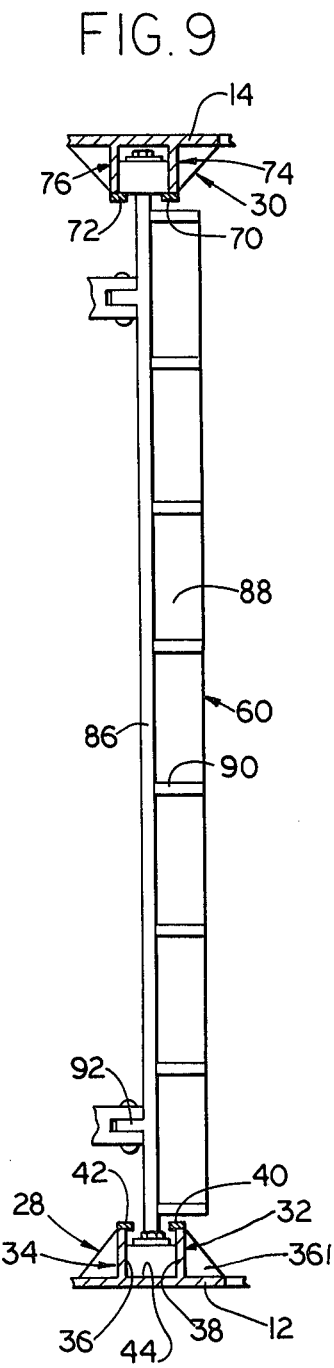

FIG. 10
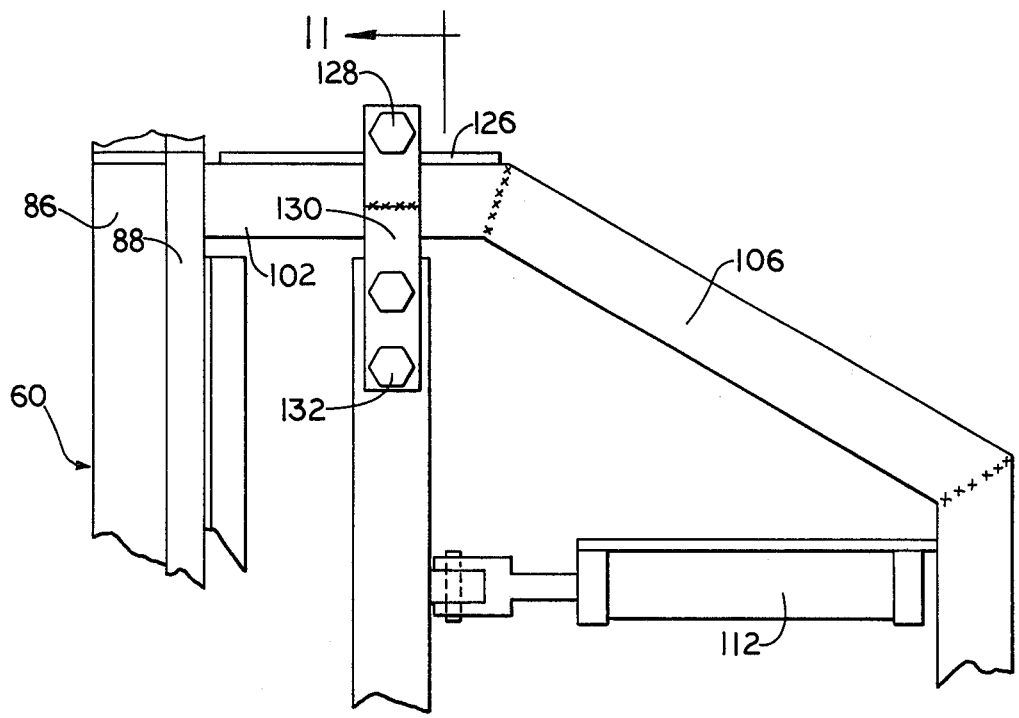
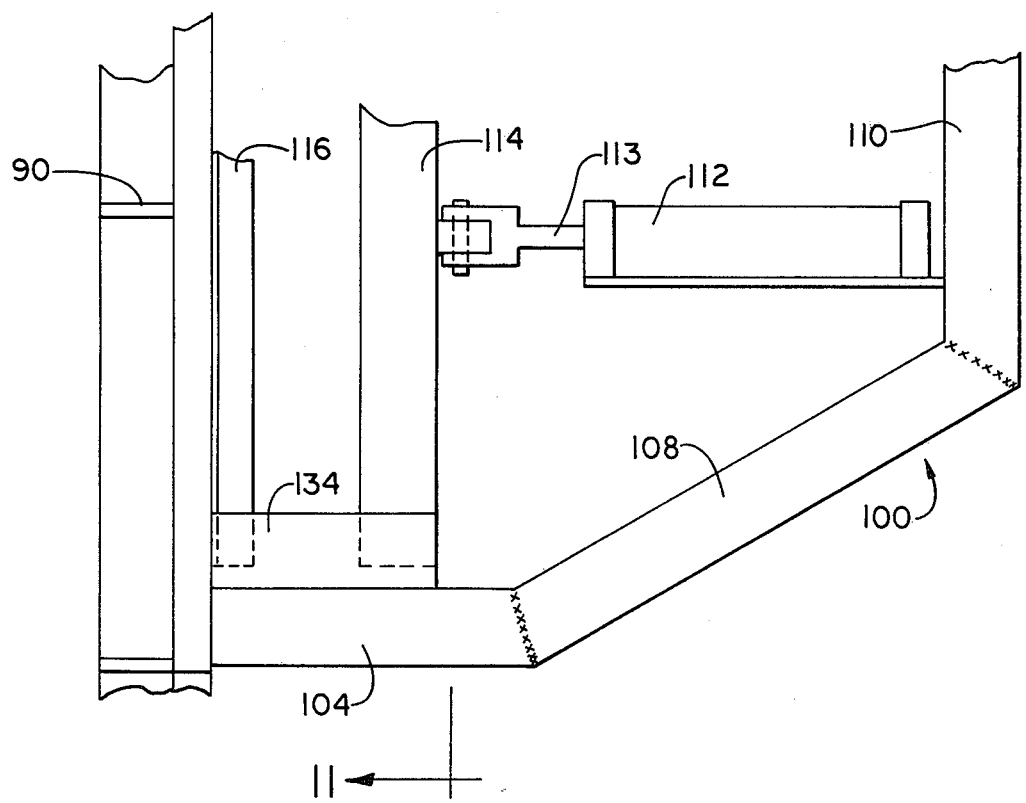

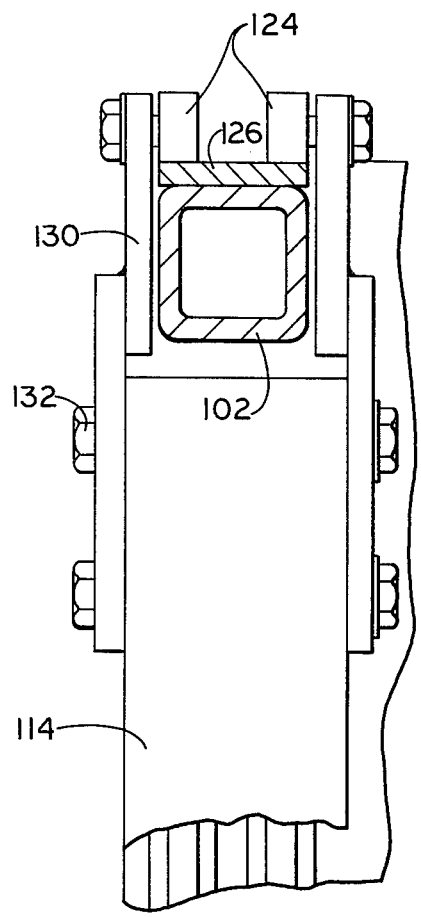
FIG. 11
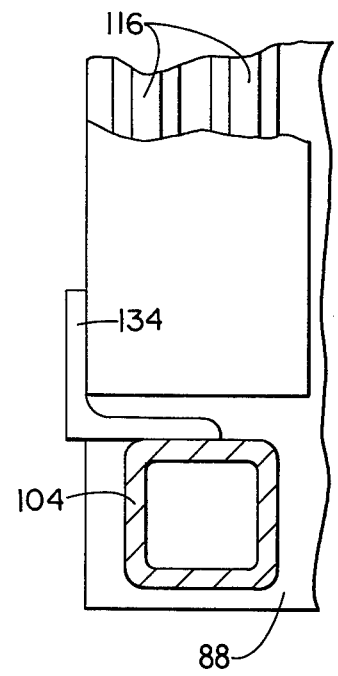
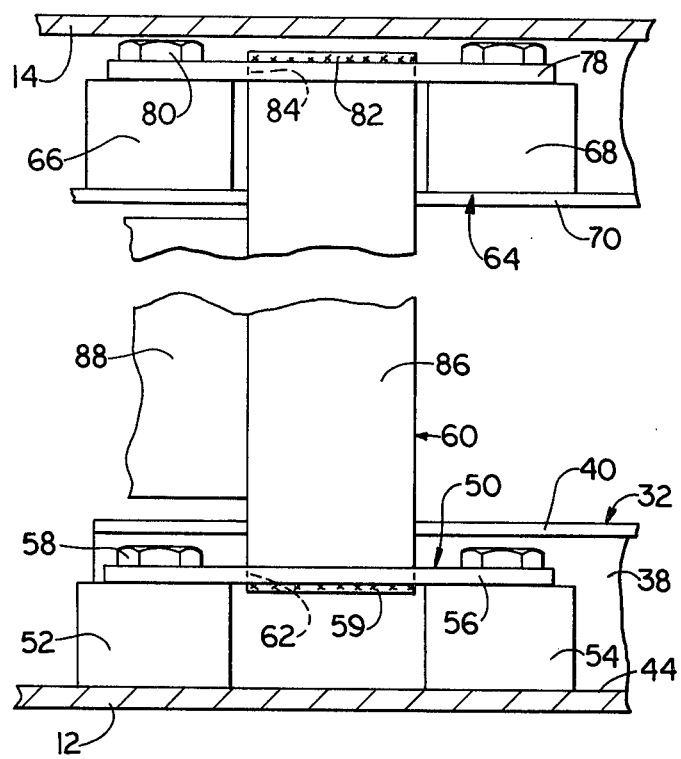
FIG. 12
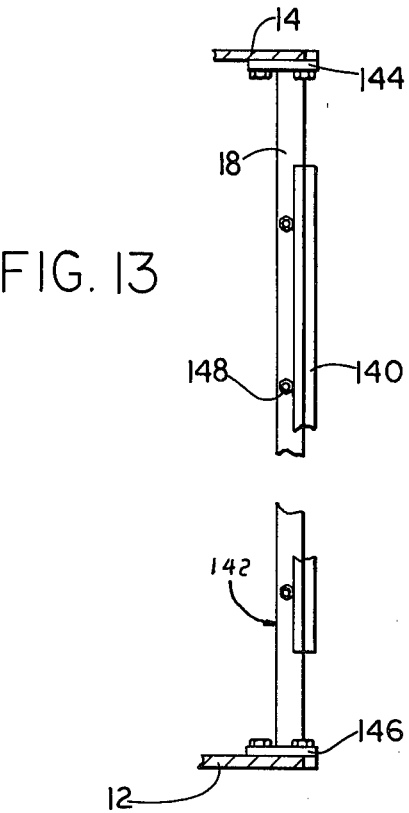
FIG. 13

ANIMAL SKINNING MACHINE

This invention relates to a machine for skinning animals. More particularly, this invention relates to a machine for pulling the skin or hide from an animal carcass.

An object of this invention is to provide an animal skinning machine which includes an elongated upright moving clamp which grips an upright edge portion of a skin and draws the skin past an elongated upright knife member to separate the skin from the rest of an animal carcass.

A further object of this invention is to provide such a machine in which upper and lower end portions of the clamp are supported by carriages which travel along track assemblies which guide the carriages for movement away from the knife member as the skin is separated from the rest of the carcass.

A further object of this invention is to provide such a machine in which an elongated upright roller is mounted for positioning parallel to and spaced from the knife member to engage and hold the skin in proper position for separation from the rest of the carcass as the carcass engages the knife member.

A further object of this invention is to provide such a machine in which upper and lower end portions of the roller are supported by roller carriages which can move toward and away from the knife member so that the roller can be withdrawn from the knife member for directing the edge portion of the skin to the clamp.

A further object of this invention is to provide such a machine in which the roller carriages are resiliently urged toward the knife member and can move away from the knife member as irregularities in the skin pass the knife member.

Briefly, this invention provides an animal skinning machine having upper and lower base frame members which are supported in spaced relation. Upper and lower clamp guide trackways are mounted on the upper and lower base frame members. Clamp carriages move along the clamp guide trackways. A clamp body is carried by the clamp carriages. A clamp frame is carried by the clamp body. Clamp actuators are carried by the clamp frame. A first clamp is mounted on the clamp body. A second clamp is carried by the clamp actuator and moves between a released position spaced from the first clamp and an engaged position for cooperating with the first clamp for engaging a leading edge portion of an animal skin. An elongated knife member is mounted between the base frame members adjacent entry ends of the clamp guide trackways for separating the skin from a carcass of the animal as the clamp carriages and the clamp body move along the clamp guide trackways. Upper and lower roller guide trackways are mounted on the upper and lower base frame members adjacent the knife member. Roller carriages are mounted on the roller guide trackways for moving therealong. A roller is rotatably mounted on the roller carriages and movable therewith between a retracted position at which the roller is spaced from the knife member and an advanced position adjacent the knife member and spaced therefrom sufficiently to permit the skin to pass between the knife member and the roller.

The above and other objects and features of the invention will be apparent to those skilled in the art to which this invention pertains from the following detailed description and the drawings, in which:

FIG. 8 is a view in section taken on an enlarged scale on the line 8—8 in FIG. 5;

FIG. 9 is a view in section taken on the line 9—9 in FIG. 5;

FIG. 10 is a view in section taken on the line 10—10 in FIG. 5;

FIG. 11 is a view in section taken on the line 11—11 in FIG. 10;

FIG. 12 is a view in section taken on the line 12—12 in FIG. 5; and

FIG. 13 is a view in section taken on the line 13—13 in FIG. 5.

In the following detailed description and the drawings, like reference characters indicate like parts.

Figure 1:
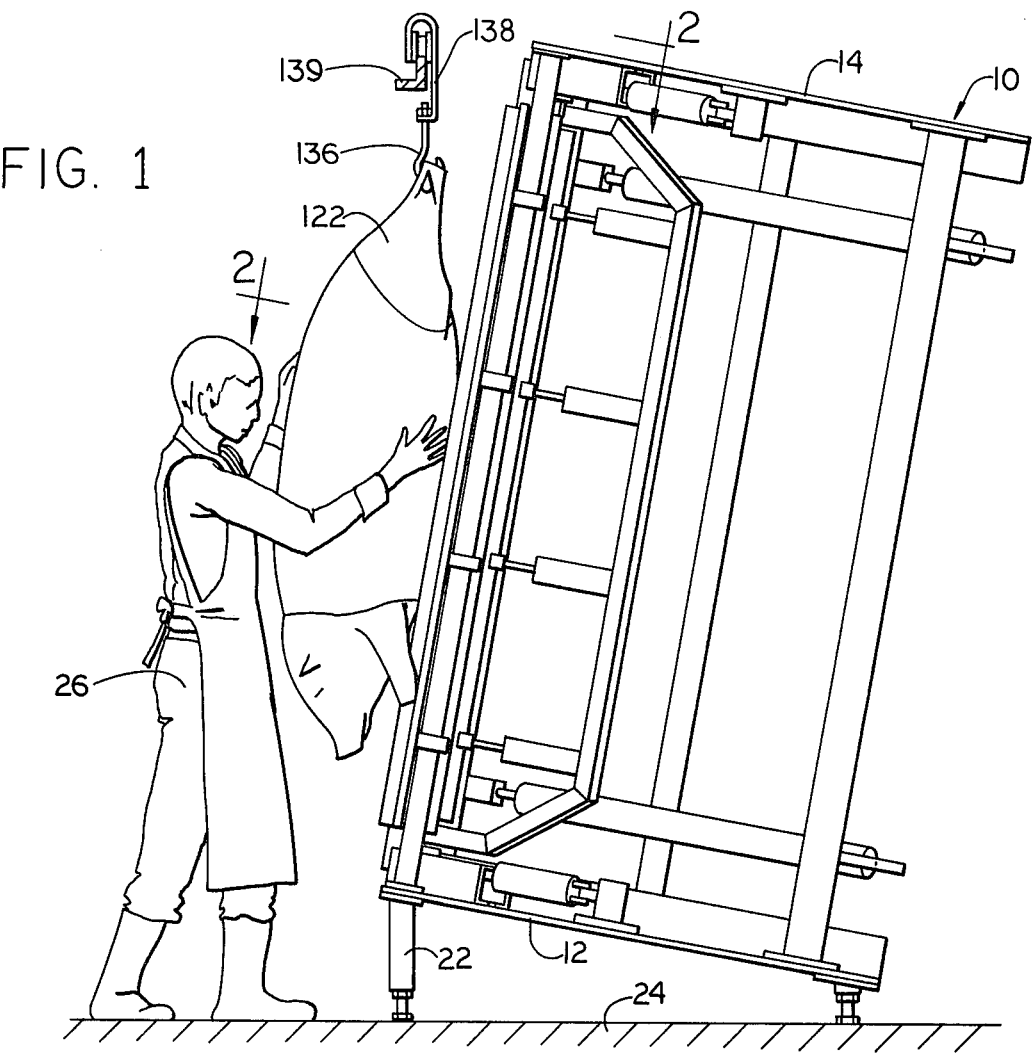
FIG. 1 is a somewhat schematic view in side elevation of an animal skinning machine constructed in accordance with an embodiment of this invention, a hog carcass and an operator being shown in association therewith.
Figure 4:
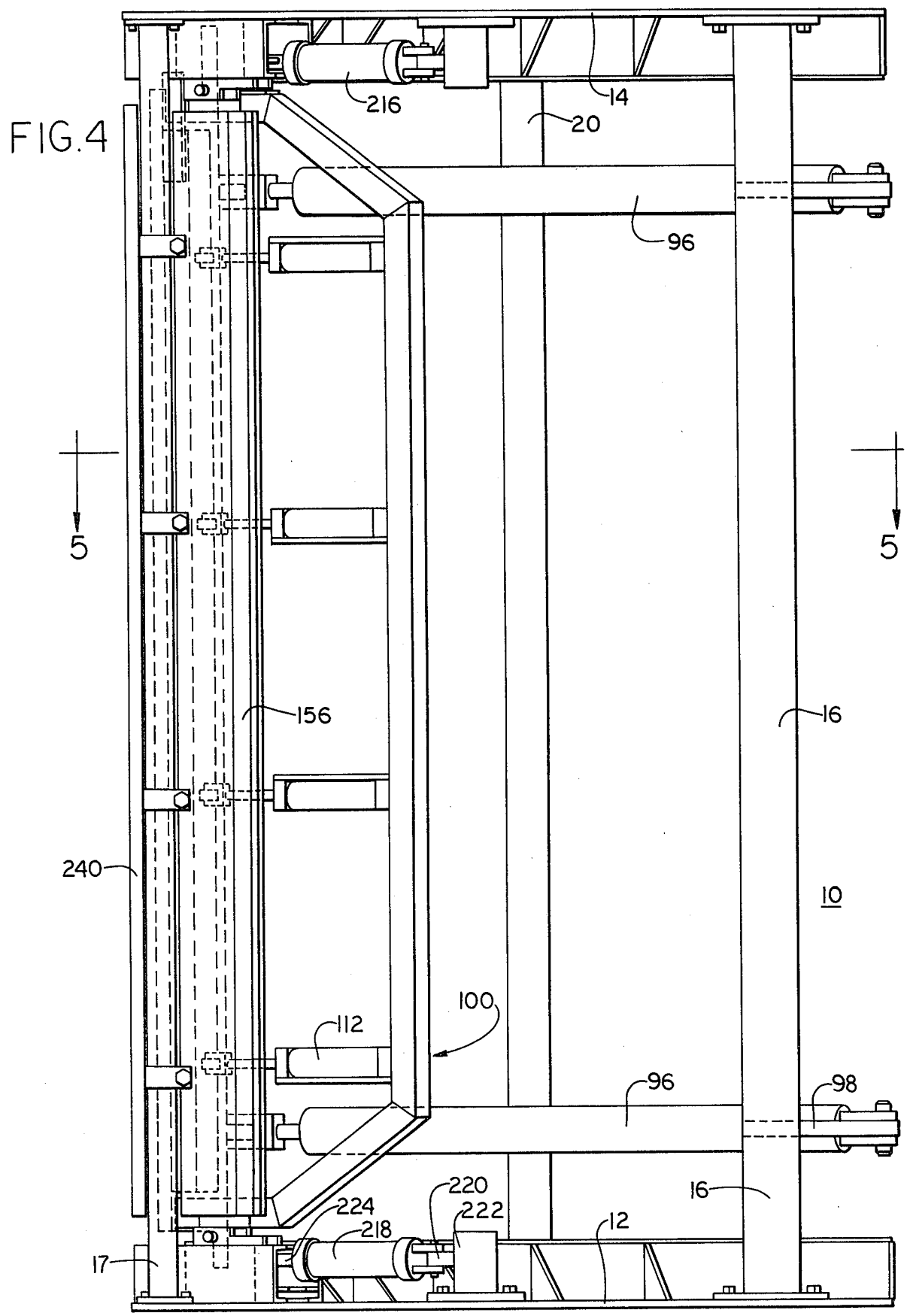
FIG. 4 is a view in side elevation of the machine on an enlarged scale.
Figure 5:
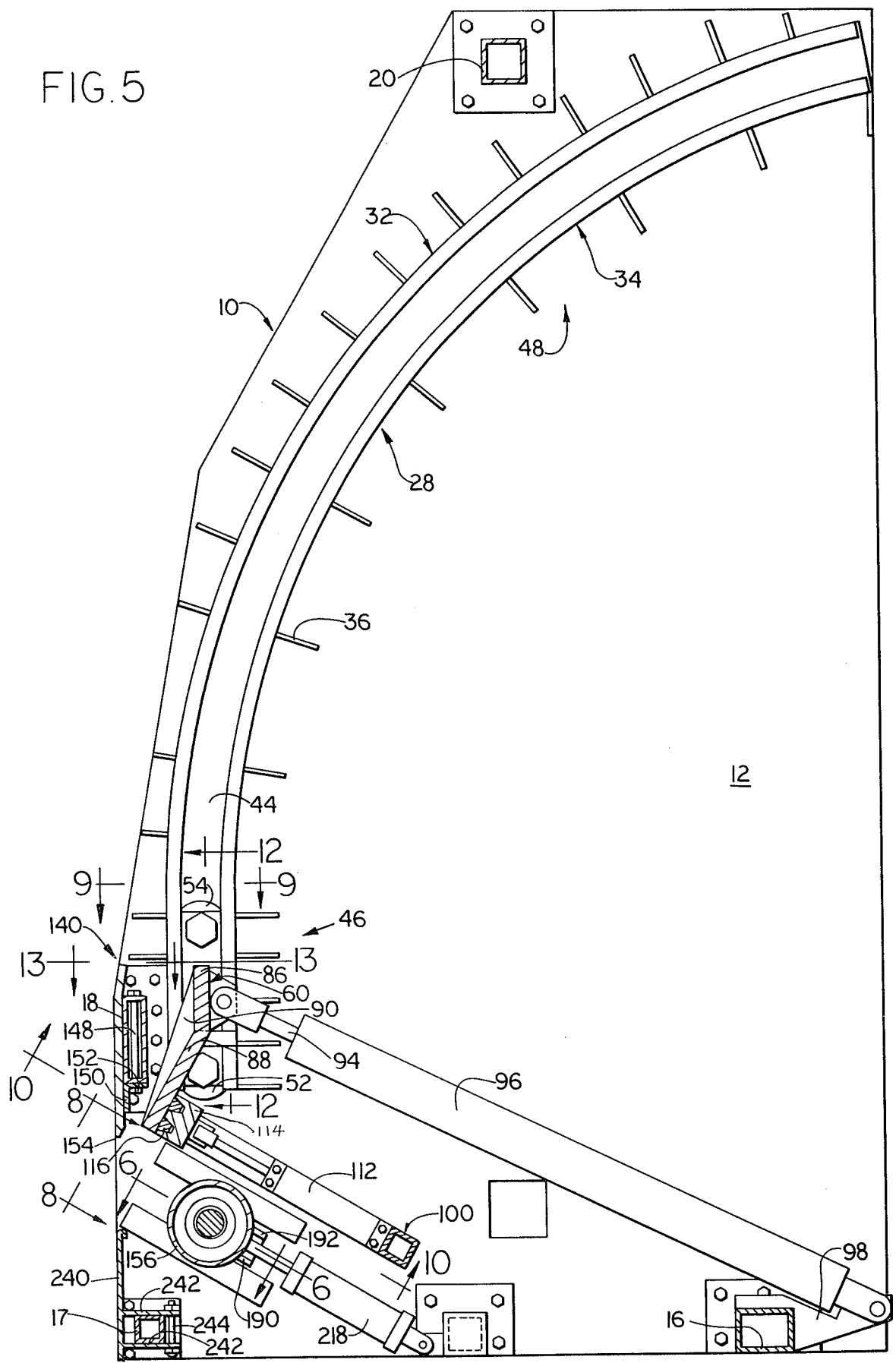
FIG. 5 is a view in section taken on the line 5—5 in FIG. 4.

In FIGS. 1, 4 and 5 is shown an animal skinning device 10 constructed in accordance with an embodiment of this invention. The animal skinning device 10 includes a lower base plate 12 and an upper base plate 14. The base plates 12 and 14 are connected and held in spaced parallelism by frame bars 16, 17, 18 and 20. Appropriate legs 22 support the lower base plate 12 on a floor 24 sloping downwardly and away from an operator station at which an operator 26 can stand at an angle of approximately 10 degrees to the floor 24. A lower track assembly 28 is mounted on the lower base plate 12. An upper track assembly 30 is mounted on the upper base plate 14. The upper and lower track assemblies 28 and 30 are substantial mirror images and are of similar construction, and only the lower track assembly 28 will be described in detail. As shown in FIGS. 5 and 9, the lower track assembly 28 includes two angle-shaped rail members 32 and 34. Lower ends of upright portions 36 and 38 of the rail members 32 and 34, respectively, are welded to the lower base plate 12. Upper portions 40 and 42 of the rail members 32 and 34, respectively, extend toward each other parallel to the base plate 12. Strengthening gusset plates 361 are welded to the upright portions 36 and 38 of the rail members 32 and 34 and to the base plate 12. A guideway 44 is formed between the rail members 32 and 34. As shown in FIG. 5, the lower track assembly 28 includes a straight portion 46 and a curving portion 48.

A lower carriage support assembly 50 (FIG. 12) runs in the guideway 44. The lower carriage support assembly 50 includes sliding blocks 52 and 54 which slide on the lower base plate 12. The sliding blocks 52 and 54 are attached to a lower carriage plate 56 by fasteners 58. A lower tongue 59 of a carriage body 60 is received in a slot 62 in the lower carriage plate 56 and welded thereto. The lower carriage support assembly 50 supports the lower end portion of the carriage body 60 for moving along the lower track assembly 28.

An upper carriage support assembly 64 supports an upper end portion of the carriage body 60. The upper carriage support assembly 64 includes sliding blocks 66 and 68 which slide on lower flanges 70 and 72 of rail members 74 and 76, respectively, of the upper track assembly 30. An upper carriage plate 78 is attached to the sliding blocks 66 and 68 by fasteners 80. An upper tongue 82 of the carriage body 60 is received in a slot 84 in the upper carriage plate 78 and welded thereto. The upper carriage support assembly 64 supports the upper end portion of the carriage body 60 for moving along the upper track assembly 30.

As shown in FIG. 5, the carriage body 60 is an elongated member having a first main section 86 extending in alignment with the tongues 59 and 82 and a second main section 88 extending at an oblique angle to the first main section 86. Gusset plates 90 (FIGS. 9 and 10) extend between the main sections 86 and 88 to strengthen the carriage body 60.

On the first main section 86 of the carriage body 60 are mounted lugs 92 to which piston rods 94 are pivotally mounted. The piston rods 94 are actuated by pistons (not shown) in cylinders 96. The cylinders 96 are pivotally connected to brackets 98 carried by the frame bar 16. When the piston rods 94 are extended and retracted, the carriage support assemblies 50 and 64 and the carriage body 60 advance along the track assemblies 28 and 30.

Figure 2:
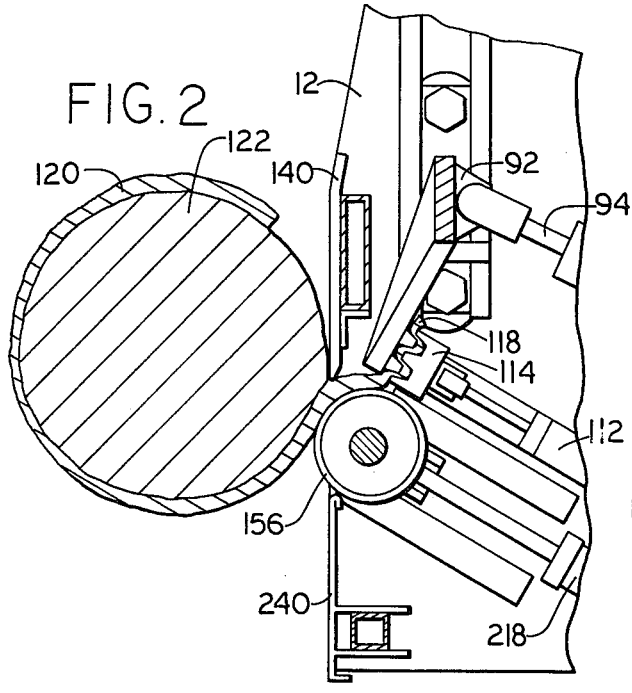
FIG. 2 is a fragmentary view in section taken on the line 2—2 in FIG. 1, an edge of the skin of the animal carcass being shown gripped by a clamp of the machine.
Figure 3:
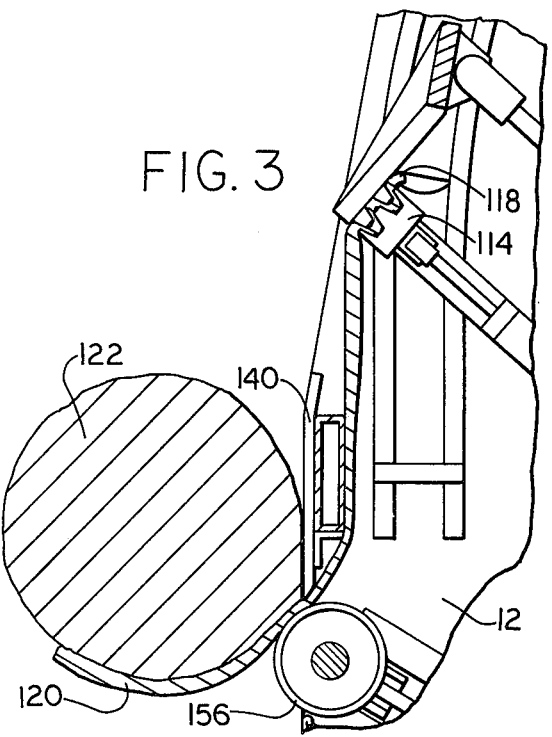
FIG. 3 is a view in section taken on the same line as FIG. 2, but with the skin partly removed.

A clamp frame 100 (FIG. 10) is carried by the second main section 88 of the carriage body 60. The clamp frame 100 includes upper and lower frame elements 102 and 104 which extend perpendicularly to the second main section 88, connecting frame elements 106 and 108, and an upright frame element 110. A set of four clamp operating cylinders 112 is mounted on the upright frame element 110. Piston rods 113 of the cylinders 112 are attached to an elongated jaw member 114. As shown in FIG. 5, the jaw member 114 includes spaced tines which can interact with elongated jaw members 116 attached to the second main section 88 of the carriage body 60. The jaw member 114 can move between a released position shown in FIG. 10 and an advanced position shown in FIG. 5. When the jaw member 114 is in the advanced position, it can engage and grip an edge portion 118 of a skin 120 of a carcass 122 as shown in FIGS. 2 and 3. The skin can be cut along the edge portion 118 in the usual fashion. An upper end of the movable jaw 114 is supported by rollers 124 which run on a plate 126 carried by the upper frame element 102. The rollers 124 are rotatably mounted on support elements 128, which are carried by upright hanger elements 130. The hanger elements 130 are attached to the movable jaw 114 by fasteners 132. A lower end portion of the movable jaw 114 is guided by an angle guide 134, which is mounted on the lower frame element 104.

The carcass 122 is supported on a hook bar 136, which is rotatably mounted on a trolley support 138 so that the carcass 122 can turn about an upright axis as shown in FIGS. 2 and 3 as the skin 120 is removed therefrom. The trolley support runs on a track 139. As the skin 120 is removed, an elongated knife member 140 separates the skin 120 from the rest of the carcass 122. The knife member 140 is supported on a knife support assembly 142 which includes the frame member 18. The frame member 18 includes end plates 144 and 146 which are attached to the upper and lower base plate 14 and 12, respectively. The frame member 18 substantially spans the base plates. A set of eight bolt fasteners 148 (only three of which are shown in FIG. 13) mounted in the frame member 18, support the knife member 140. The fasteners 148 extend through openings (not shown) in an angle fitting 150, which is attached to the knife member 140. Nuts 152 on the bolt fasteners 148 hold the knife member 140 in position on the frame member 18. An edge portiion 154 of the knife member 140 serves to sever the skin 120 from the rest of the carcass 122.

As the skin 120 is removed from the rest of the carcass 122 by action of the knife member 140, a roller 156, having an upright axis, is held in the position shown in FIGS. 2 and 3 to hold the skin in position for separating from the rest of the carcass by the knife member. The roller 156 includes a tubular body 158, annular end plates 160 at opposite ends of the body 158, only one of which is shown, and bearing support rings 161 mounted on the end plates 160. Bearing rings 162 are mounted in the bearing support rings 161. A roller shaft 164 rotatably supports the roller 156. A collar 163, which is attached to the roller shaft 164 by a fastener 165, holds and supports the roller 156 on the roller shaft 164. A lower end portion 167 on the shaft roller 164 is supported by a lower roller carriage 166. An upper end portion of the roller shaft is supported by an upper roller carriage 168. The roller carriages are similar in construction, and only the lower roller carriage 166 and associated track elements will be described in detail.

The lower roller carriage 166 is guided by channel-shaped track members 170 and 172. Flanges 174 and 176 of the track members 170 and 172 are attached to the lower base plate 12 as shown in FIG. 8. Horizontal rail plates 178 and 180 are mounted on webs of the track members 170 and 172, respectively. The horizontal rail plates 178 and 180 support wheels 182 and 184, respectively. The wheels 182 and 184 rotatably support shafts 186 and 188, which are mounted on side plates 190 and 192, respectively. The side plates 190 and 192 are held in spaced parallelism by a case bottom plate 194 and a case front plate 196. A pin 198 extends through an opening 200 in the lower end portion 167 of the roller shaft 164 and through openings 204 in the side plates, only one of which is shown, so that the lower end portion 167 of the roller shaft 164 is supported on the lower roller carriage 166 for moving lengthwise of the track members 170 and 172.

A guide plate 206 is attached to a lower end face of the case bottom plate 194 and extends downwardly therefrom. Thrust block members 208 and 210 are attached to the lower base plate 12 between the track members 170 and 172. Each of the thrust block members includes an angled portion 212, which can guide the guide plate 206 to centered position between the track members 170 and 172 and a main portion 214, which extends parallel to the track members 170 and 172. The main portions are spaced to provide only slight clearance on opposite sides of the guide plate 206 so that the main portions hold the guide plate 206 and the lower roller carriage 166 firmly in centered position between the track members 170 and 172 when the roller 156 is in the advanced skin engaging position shown in FIGS. 2 and 3.

Figure 6:
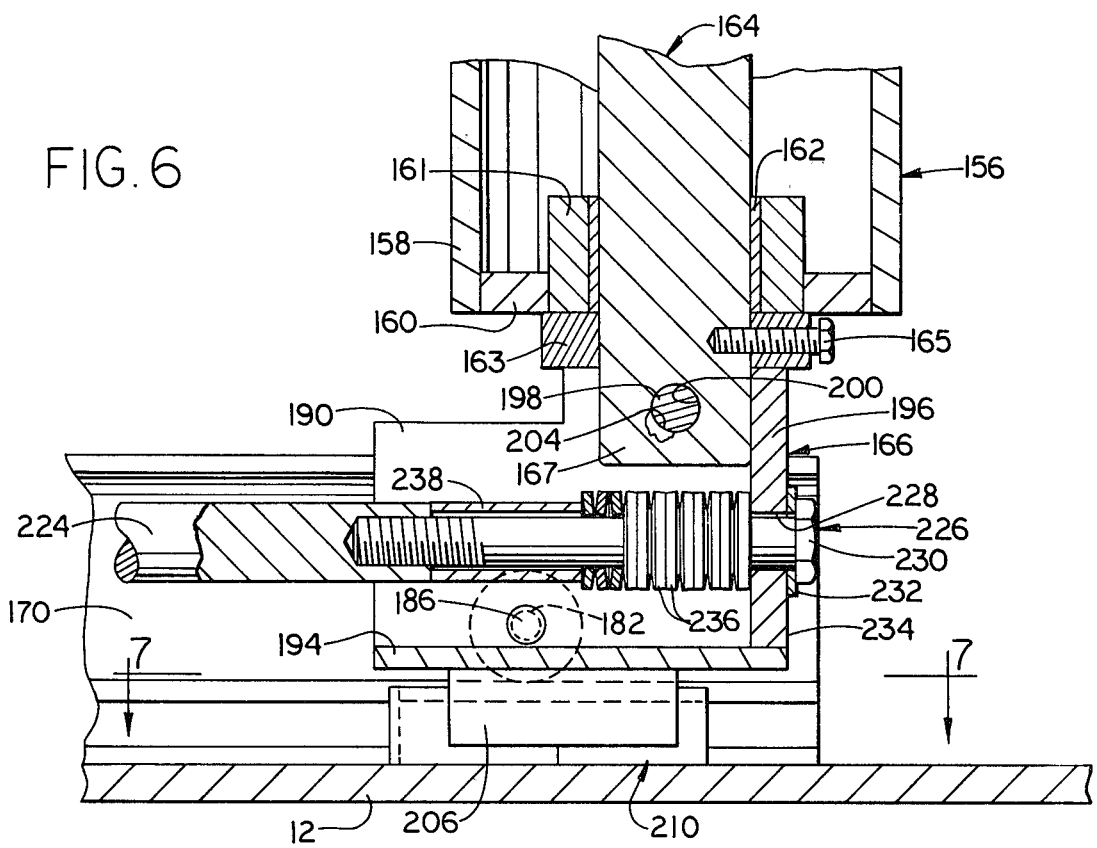
FIG. 6 is a view in section taken on an enlarged scale on the line 6—6 in FIG. 5.
Figure 7:
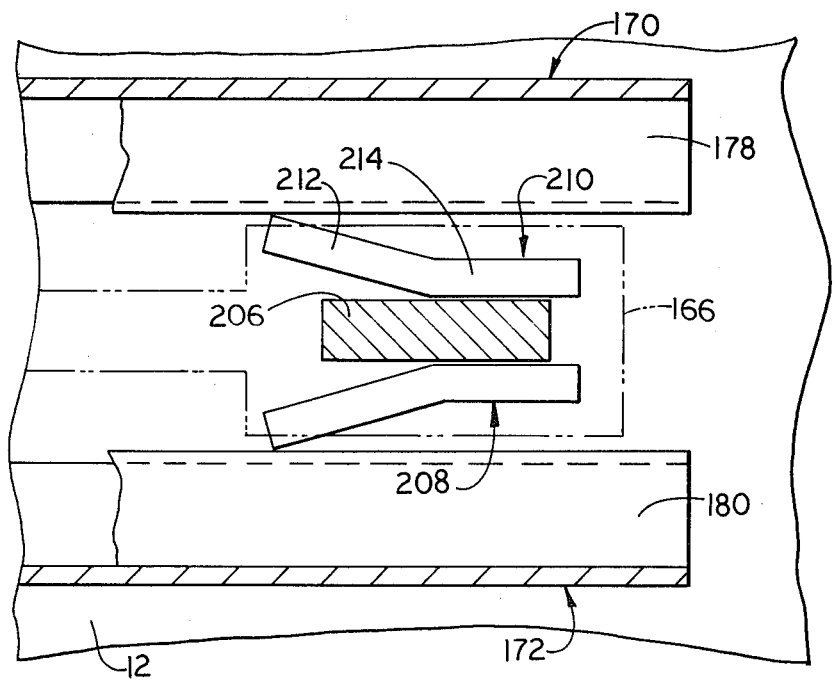
FIG. 7 is a view in section taken on the line 7—7 in FIG. 6.

The upper and lower roller carriages 168 and 166 are advanced and retracted by action of upper and lower roller cylinders 216 and 218. The roller cylinders and associated elements are similar, and only the lower roller cylinder 218 and associated elements will be described in detail. The lower roller cylinder 218 is pivotally mounted on a mount bracket 220 carried by a stub post 222. The stub post 222 is mounted on the lower base plate 12. A piston rod 224 is actuated by the lower roller cylinder 218. As shown in FIG. 6, a fastener 226 is mounted in an end portion of the piston rod 224. The fastener 226 extends through an opening 228 in the case front plate 196. A head 230 of the fastener 226 can engage a washer 232. The washer 232, in turn, can engage a face 234 of the case front plate 196. A plurality of resilient cupped spring washer members 236 and a spacer sleeve 238 are mounted on the shaft of the fastener 226. When the roller 156 is in the advanced position shown in FIGS. 2 and 3, the roller 156 is resiliently urged against the skin 120 and, if there are irregularities in the skin 120, the resilient cupped spring washer members 236 can be compressed to permit the roller 156 to retract sufficiently to pass the irregularities. If desired, the number of cupped spring washer members on the shaft of the fastener 226 can be varied to adjust the pressure on the roller 156 and the degree of movement of the roller 156 as the cupped spring washer members are compressed. When the number of cupped spring washer members is changed, a spacer sleeve of a different length can be substituted for the spacer sleeve 238.

A guard plate 240 is mounted on the frame bar 17 to guide the carcass 12 to the roller 156 and the knife member 140. Bar supports 242 are attached to the guard plate 240. Bolt fasteners 244 extend through openings (not shown) in the bar supports 242 to draw the bar supports 242 into frictional engagement with the frame bar 17 to support the guard plate.

When the carcass 122 reaches the operator station, the operator 26 (FIG. 1) positions the carcass 122 opposite the knife member 140 and advances the edge portion 118 of the skin 120 between the jaw members 114 and the jaw members 116. The cylinders 112 are actuated to advance the jaw 114 to the position shown in FIG. 2 at which the edge portion 118 of the skin 120 is held between the jaw members 114 and 118. Then, the cylinders 216 and 218 are actuated to cause advance of the roller 156 to the position shown in FIGS. 2 and 3 at which the knife member 140 and the roller 156 are spaced just sufficiently to permit the skin 120 to pass therebetween. Then, the cylinders 96 are actuated to cause the carriage body 60 to advance along the track assemblies 28 and 30 as shown in FIG. 3 to cause the skin 120 to separate from the rest of the carcass 122. Then piston rods of the cylinders 112 can be retracted to cause release of the jaw members 114 and 116 and pistons of the cylinders 96 and 218 can be retracted to the positions shown in FIG. 5 to return the carriage body to its starting position and to withdraw the roller 156 to complete the cycle of the machine.

The machine illustrated in the drawings and described above is subject to structural modification without departing from the spirit and scope of the appended claims.

Having described our invention, what we claim as new and desire to secure by letters patent is:

1. An animal skinning machine which comprises upper and lower base frame members, means for supporting the base frame members in spaced relation, upper and lower clamp guide trackways mounted on the upper and lower base frame members, clamp carriages mounted on the clamp guide trackways for moving therealong between entry ends and output ends of the clamp guide trackways, a clamp body carried by the clamp carriages, first clamp means mounted on the clamp body, a clamp frame carried by the clamp body, clamp actuator means carried by the clamp frame, a second clamp means carried by the clamp actuator means and movable by the clamp actuator means between a released position spaced from the first clamp means and an engaged position for cooperating with the first clamp means for engaging a leading edge portion of an animal skin, an elongated knife member mounted between the base frame members adjacent the entry ends of the clamp guide trackways for separating the skin from a carcass of the animal as the clamp carriages and the clamp body move along the clamp guide trackways from the entry ends toward the output ends, upper and lower roller guide trackways mounted on the upper and lower base frame members adjacent the knife member, roller carriages mounted on the roller guide trackways for moving therealong, and a roller rotatably mounted on the roller carriages and movable therewith between a retracted position at which the roller is spaced from the knife member and an advanced position adjacent the knife member and spaced therefrom sufficiently to permit the skin to pass between the knife member and the roller.

2. An animal skinning machine as in claim 1 in which the roller is supported on the roller guide carriages by a resilient mounting so that the roller can retract against the resilient mounting to accommodate irregularities in the skin.

3. An animal skinning machine as in claim 1 in which the knife member, the clamp body, and the roller are parallel and slope upwardly and away from an operator station and means is provided at the operator station for supporting the animal carcass in engagement with the knife member as the skin is held by the clamp means.

4. An animal skinning machine as in claim 3 in which the knife member, the clamp body, and the roller slope upwardly and away from the operator station at an angle of approximately 10 degrees to the vertical.

* * * * *